April 15, 1941. H. M. SLOAT 2,238,233
LOAD CARRYING APPARATUS
Filed Sept. 14, 1939 2 Sheets-Sheet 1

INVENTOR
HOWARD M. SLOAT.
BY
ATTORNEY

April 15, 1941.   H. M. SLOAT   2,238,233
LOAD CARRYING APPARATUS
Filed Sept. 14, 1939    2 Sheets-Sheet 2

INVENTOR
HOWARD M. SLOAT.
BY John R. Hanrahan
ATTORNEY

Patented Apr. 15, 1941

2,238,233

UNITED STATES PATENT OFFICE 2,238,233

LOAD CARRYING APPARATUS

Howard M. Sloat, Fairfield, Conn.

Application September 14, 1939, Serial No. 294,819

7 Claims. (Cl. 296—24)

This invention relates to new and useful improvements in delivery apparatus such as is used in the delivery of milk and the like and has particular relation to an apparatus to be used in a delivery truck for easing the burden of loading and unloading the truck of cases or the like and for facilitating the efforts of the driver or operator to gain access to any part of the load of the truck.

The objects and advantages of the invention will become apparent from a consideration of the following detailed description taken in connection with the accompanying drawings wherein a satisfactory embodiment of the invention is shown. However, it is to be understood that the invention is not limited to the details disclosed but includes all such variations and modifications as fall within the spirit of the invention and the scope of the appended claims.

In the drawings—

Figure 1:
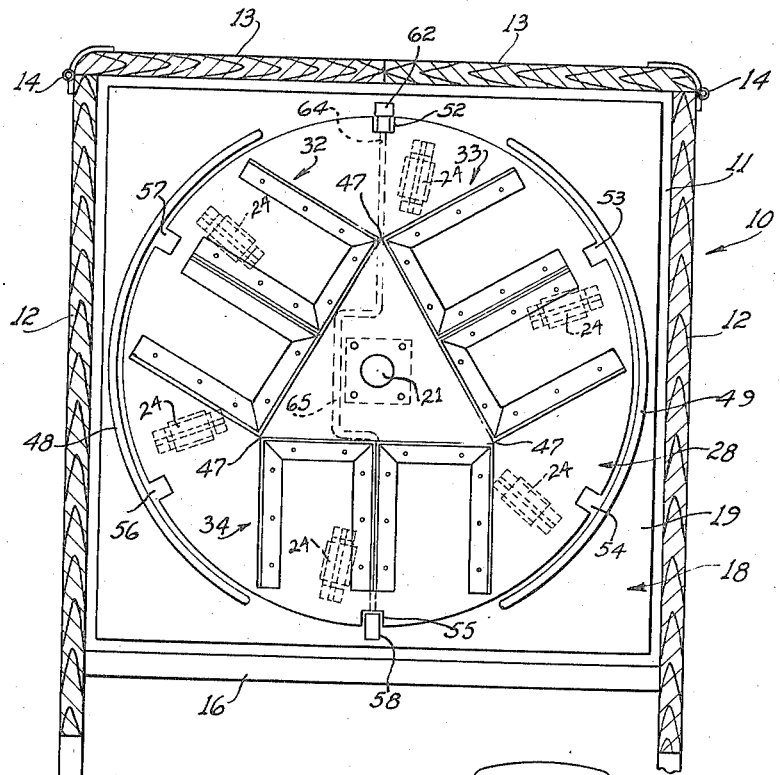
Fig. 1 is a top plan view of the apparatus of the invention as installed in a truck body a portion only of the latter being shown.

Referring in detail to the drawings at 10 is generally indicated a portion of a delivery truck the body of which includes a floor 11, side walls 12 and rear doors 13 hinged as at 14. Toward the front end of the truck, in the rear of the driver's seat 15, is a rail 16 although if desired a wall may be used at this point provided such wall is equipped with a door opening to give access to the interior of the truck body. Convenient to the driver's seat 15 will be the usual controls including the steering wheel a portion of which is shown at 17.

Figure 3:
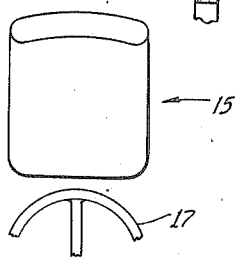
Fig. 3 is an enlarged view in section of the lower portion of Fig. 2.
Figure 3:
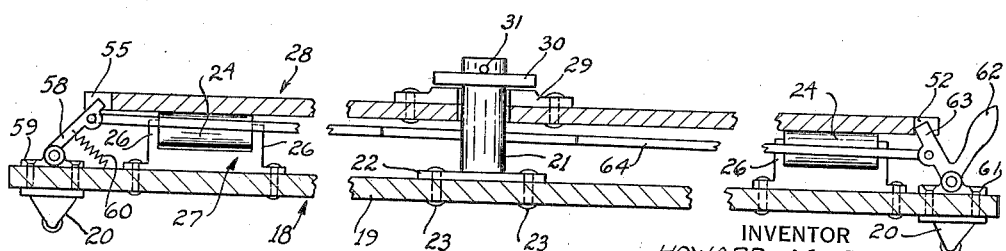

The apparatus of the invention includes a dolly generally designated 18 and comprising a platform 19 mounted on casters 20, although as the description proceeds it will become apparent that the dolly may in some instances be omitted. Secured to project above the upper side of the dolly platform 19 is a stud or bearing member 21 mounted on a base plate 22 and secured to the said dolly platform as by rivets, bolts or the like 23 (see Fig. 3).

Figures 4, 5:
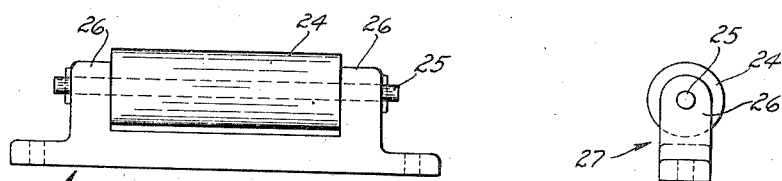
Fig. 4 is a side elevational view of a roller employed.
Fig. 5 is an end elevational view of such roller.

Also on said platform are mounted rollers 24 all of said rollers being of the same construction the details being shown in Figs. 4 and 5. Each roller 24 is arranged on a shaft 25 having bearing at its ends in the arms 26 of a mounting bracket 27 which may be bolted or otherwise secured to the dolly. As clearly shown in Fig. 1 the brackets 27 are so arranged on the dolly that the shafts 25 and the rollers 24 are radial with respect to the bearing stud 21. Moreover such rollers are equally spaced and are located remote from said stud for a purpose to be described.

Disposed on the rollers 24 is a platform or turntable 28 having a central opening receiving the stud 21 and about such opening carrying a collar or bearing 29 engaging the stud. With this arrangement it will be clear that the weight of the turntable 28 is carried by the rollers 24 and that the turntable is rotatable about the stud 21 as an axle. On the upper side of the collar 29 is a washer 31 disposed about the stud 21 and held thereon as by a pin or the like 31 passing through the stud. Thus when the turntable is on the stud and within a truck body any jolting of the said body will not result in the turntable being jolted out of position with respect to the stud.

Figure 6:
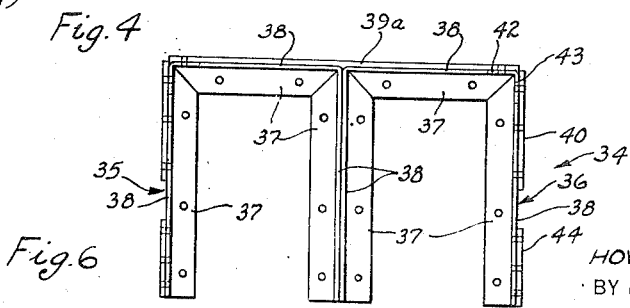
Fig. 6 is an enlarged view showing the construction of the lower portion of one of the load receiving racks employed.

Secured on the upper side of the turntable are three double section milk case receiving racks designated respectively 32, 33 and 34 although it will be understood that such racks are duplicates of one another and a detailed description of but one will be given. Each double rack includes two pieces of angle iron 35 and 36 respectively (see also Fig. 6) bent into substantially U-shape and secured with one angle portion 37 against the turntable while its other angle portion 38 is disposed to extend upwardly defining the outer edge of the rack.

Figure 2:
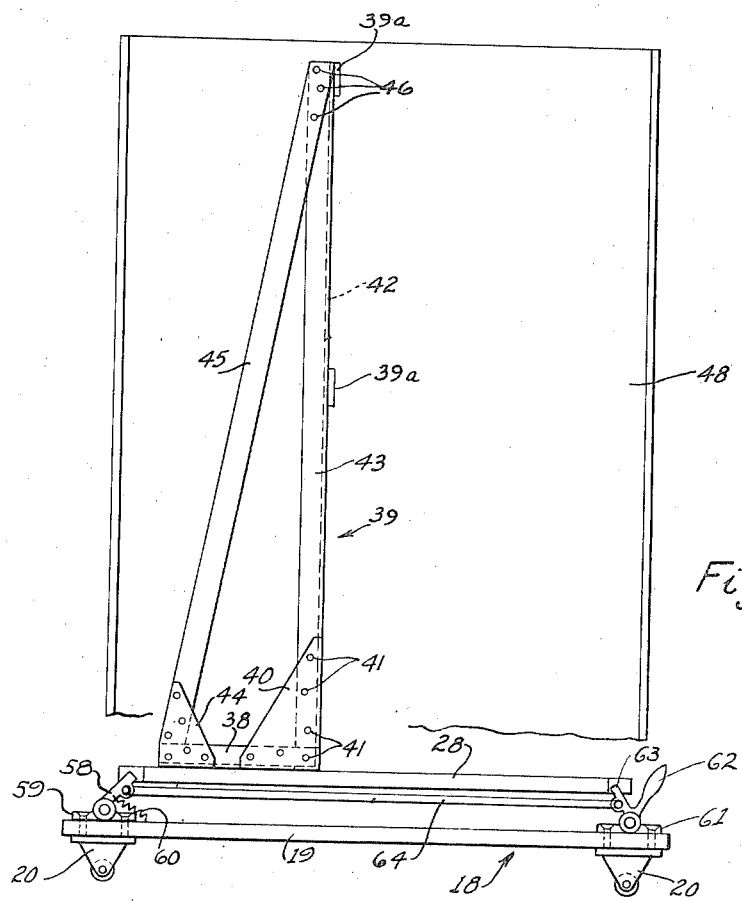
Fig. 2 is a vertical sectional view taken as along the plane of the line 2—2 of Fig. 1.

Corner uprights 39 are secured to the rear corners of the pieces 35 and 36 as by braces 40 riveted to the angle portions 38 and to said uprights as at 41. Uprights 39 are also of angle iron and their rear angle portions 42 define the rear of the racks while their side angle portions 43 define the sides of the racks. A brace plate 44 is riveted to angle portion 38 and to a side member 45 and anchors the lower end of said member to the base iron 35 or 36 as the case may be. Member 45 at its upper end is riveted to the upper portion of the upright 39 at 46 it being clear from Fig. 2 that said side member is arranged at an incline. Cross or tie pieces 39a connect the uprights at their upper and intermediate portions.

The double racks 32, 33 and 34 are arranged one hundred and twenty degrees apart whereby to have the weight of any load in the racks evenly distributed on the turntable. The inner corners of the racks may abut as at 47 in Fig. 1 whereby the racks to some extent act to brace one another. Obviously the open sides of the racks face toward the outer edge of the turntable and it will be apparent that cases of milk or the like may be inserted into and removed from the racks through such open sides, the cases when in the racks being disposed one on the other.

Disposed on the platform of the dolly and extending vertically therefrom about the turntable is a metal wall comprising a pair of curved plates or the like 48 and 49 arranged with their vertical edges spaced from one another to provide openings 50 and 51 located, when the dolly is within the truck as in Fig. 1, at the front and rear respectively of the dolly. In the edge of the turntable are six notches numbered respectively 52, 53, 54, 55, 56 and 57. Such notches are equally spaced and it is noted that the notches numbered 53, 55 and 57 are aligned with the double racks 33, 34 and 32 respectively. As the invention is better understood it will become clear that the number of racks on the turntable and the number of notches in the edges of the turntable may be varied depending on the goods to be carried and the like.

Obviously the racks move with the turntable on any turning movement of the latter and when the turntable is positioned as in Fig. 1 cases or other goods may be removed from the rack 34 since it is facing opening 50. However, since the other racks are facing portions of the wall members 48 and 49 nothing may be moved from such other racks and the cases or the like in such other racks are prevented from falling therefrom by said wall members. The notches in the edge portion of the turntable comprise portions of latching means to be described and which functions to hold the turntable in desired positions of adjustment. For example, the latching means (to be described) may be used to hold the turntable in position with any rack aligned with either the opening 50 or the opening 51 and it will be noted that when any rack is in alignment with either opening no rack is in alignment with the other opening.

The latching means as here shown comprises a foot piece 58 pivotally mounted on the dolly as by a bracket means 59. Connected with such lever 58 is a spring 60 normally tending to raise the foot piece or to swing it upwardly about its pivot to carry it out of a notch in the edge of the turntable or to bring it into such a notch when the lever has been forced to a position below the turntable. Obviously foot lever 58 is located at the front of the dolly and in fact in the opening 50.

Secured to the rear portion of the dolly and located in the opening 51 is a bracket 61 pivotally mounting a hand device including a hand lever 62 and a turntable notch engaging portion 63. A rod or link 64 extends across the dolly below the turntable 28 and is pivotally connected at its respective ends with the foot lever 58 and the notch engaging portion 63 of the hand device. As shown in Fig. 1 the intermediate portion of the link or rod 64 is off-set at 65 to pass about the stud 21.

In the use of the device the dolly may be rolled from the truck body and into a loading room or onto a loading platform and the racks filled with cases stacked one on the other. Thereafter the loaded device is rolled into the truck body and as above explained the dolly substantially fills the body so as to have no free movement therein between the sides 12 or between the rib or sill piece 16 and the rear doors 13. Now the operator adjusts the turntable to a position where none of the racks is in alignment with the opening 50.

In such position of the turntable the latch means 58 and 63 are in engagement with either the notches 54 and 57 or the notches 53 and 56. Thereafter as the operator drives to his route for delivery should he be compelled to suddenly stop or should he have an accident the cases comprising his load cannot topple over onto him. Such cases are confined by the wall members 48 and 49.

Arriving at his route or place of delivery the operator to gain access to the contents of any of the racks steps on the treadle or lever 58 thereby forcing it out of the notch in which it is engaged. This same movement of the treadle (against the action of the spring 60) acting through the link or rod 64 moves the hand device portion 63 out of its notch. Now the turntable may be rotated to bring any rack opposite the opening 50 or in fact opposite the opening 51 as desired.

As a rack is aligned with one of the openings should the lever 58 be released the spring 60 will move the latch members into a pair of the notches in the turntable to secure the latter in position. Since the free end of the portion 63 of the hand device engages the inner end of its notch or the notch with which it is cooperating at any particular time, its movement will be limited and through the link 64 such engagement will prevent the spring 60 from shifting the lever 58 upwardly through its notch to an inoperative position.

It will be understood that the operator uses the treadle or lever 58 only when he is securing the turntable in position for a trip or when he is working to unload from the front of the truck. When he wishes to work from the rear of the vehicle he opens the doors 13 and thus has access to the hand device and by pulling rearwardly on the hand lever 63 draws the portion 63 out of its notch. This motion is transmitted through the link or rod 64 to the lever or treadle 58 and the latter is drawn downwardly and forwardly out of the notch with which it may be engaged. Thereafter the turntable may be rotated to present the desired rack at the opening 51. The hand lever 62 is provided since when the operator is standing on the ground below the level of the dolly operation of the latch by hand is more convenient.

While the entire apparatus has been described as mounted on dolly 18 it will be understood that this is a matter of convenience and that certain parts of the apparatus are adapted to be mounted directly on the floor of the vehicle to provide for the convenient unloading and to provide also a structure wherein the load may be so secured that it is readily accessible but yet so confined that on the making of a sudden stop the load is held back and may not topple over onto the driver of the vehicle.

Attention is directed to the fact that since the turntable rests on the rollers 24 and the latter are supported by the dolly and are not attached in any way to the turntable, there are no parts on the underside of the latter to interfere with the use of the link 64. Also it will be clear that the turntable may be secured in any desired position from either the front or back of the truck and that it may be released for turning movement when the operator is in either of said positions and irrespective of the position he previously occupied when securing the turntable.

Having thus set forth the nature of my invention, what I claim is:

1. In a delivery vehicle, side walls and a non-circular body including a floor and rear doors adapted to permit a dolly to be rolled into and out of the body when open, a dolly movable into and out of said body to rest on said floor when in the body, said non-circular dolly of such size with respect to the interior of the body as to be held against movement by the side walls and doors of the vehicle when within said body with the doors closed, a turntable on said dolly, and load receiving means on said turntable.

2. In a load carrying apparatus, a dolly, a bearing means extending upwardly from said dolly, rollers on the upper side of the dolly, a platform resting on said rollers and turnable about said bearing means as a center, vertically disposed load receiving racks on said platform, latch means on said dolly for securing said platform against casual movement relative to the dolly, and means for manually operating said latch means to released position to permit of turning of said platform on said rollers relative to the dolly.

3. In a load carrying apparatus, a dolly, a bearing means on said dolly, rollers on the upper side of said dolly, a platform supported on said rollers and turnable about said bearing means, vertically disposed load carrying racks on said platform and turnable therewith, latch means on said dolly for securing said platform against casual movement relative to the dolly, means on said dolly and extending under and independent of said platform and extending beyond the latter at spaced points for manual operation from each of said points to release said latch means and permit of turning of the platform relative to the dolly, and said latch means manually operable at will.

4. In a wheeled delivery vehicle, a body having a horizontal floor, a dolly movable into and out of said vehicle resting on said floor when in the vehicle, rollers on the upper side of said dolly, a platform resting on said rollers, a center bearing between said dolly and platform and about which the latter is turnable while resting on said rollers, open faced milk case receiving racks on the upper side of said platform and turnable therewith and facing toward the peripheral edge thereof, a stationary vertical wall carried by said dolly and extending substantially about said platform and having an opening through which milk cases may be moved to and from said racks on alignment of the latter with said opening, and cooperating means between said dolly and platform for locking the latter in position with all of said racks out of alignment with said opening.

5. In a wheeled delivery vehicle, a body having a horizontal floor, a dolly movable into and out of said vehicle and resting on said floor when in the vehicle, rollers on the upper side of said dolly, a platform resting on said rollers, means centering said platform with respect to said rollers for turning movement on the latter, load receiving racks on the upper side of said platform and turnable therewith and facing toward the peripheral edge thereof, a stationary vertical wall carried by said dolly and extending substantially about said platform and having front and rear openings through which a load may be moved to and from said racks on alignment of the latter with either of said openings, said platform having notches in its edge, front and rear latch means on said dolly in association with the front and rear openings in said vertical wall and adapted to engage in said notches and lock the platform against casual movement, means mounted on the dolly and extending under and independent of said platform and connecting said latches for simultaneous movements to and from locking positions, and a spring associated with one of said latches and acting on it and through said connecting means to normally urge both said latches toward engagement in said notches.

6. In a load carrying apparatus, a rotatable platform, three equally spaced racks on the upper side of said platform, each of said racks comprising a pair of U-shaped base members of angle iron arranged side by side against the platform with their open sides facing toward the edge of the platform, vertically disposed rear members extending upwardly from said base members, and vertically inclined side members connected at their lower ends with forward portions of said base members and at their upper ends with upper portions of said rear members whereby said racks are each adapted to receive two stacks of cases arranged side by side and confine said cases from the sides and rear end.

7. In a wheeled delivery vehicle, a body having a horizontal floor, a dolly movable into and out of said vehicle resting on said floor when in the vehicle, rollers on the upper side of said dolly, a platform resting on said rollers, a center bearing between said dolly and platform and about which the latter is turnable while resting on said rollers, and open faced milk case receiving racks on the upper side of said platform and turnable therewith and facing toward the peripheral edge thereof.

HOWARD M. SLOAT.